United States Patent [19]

White et al.

[11] Patent Number: 4,858,983
[45] Date of Patent: Aug. 22, 1989

[54] SUN VISOR FRAME AND MOUNTING STRUCTURE

[76] Inventors: Jay E. White, 2937 Strawberry; Jay R. White, 4388 Lehigh Dr., both of Troy, Mich. 48098

[21] Appl. No.: 177,055

[22] Filed: Apr. 4, 1988

[51] Int. Cl.⁴ .............................................. B60J 3/00
[52] U.S. Cl. ................................. 296/97.13; 296/97.1
[58] Field of Search .................... 296/97.1, 97.5, 97.9, 296/97.12, 97.13

[56] References Cited

U.S. PATENT DOCUMENTS

| | | | |
|---|---|---|---|
| 3,017,217 | 1/1962 | Keating | 296/97.13 |
| 3,199,913 | 8/1965 | Field et al. | 296/97 |
| 3,827,748 | 8/1974 | Herr et al. | 296/97 H |
| 3,871,703 | 3/1975 | Accatino | 296/97 H |
| 4,353,591 | 10/1982 | Cziptschirsch | 296/97 H |
| 4,384,740 | 5/1983 | Marrotta | 296/97.1 |
| 4,477,116 | 10/1984 | Viertel et al. | 296/97 H |
| 4,500,131 | 2/1985 | Fleming | 296/97.12 |
| 4,518,192 | 5/1985 | Canadas et al. | 296/97.5 |
| 4,576,409 | 3/1986 | Ebert | 296/97.1 |
| 4,648,011 | 3/1987 | Boote et al. | 296/97.5 X |
| 4,653,798 | 3/1987 | White et al. | 296/97 H |
| 4,685,723 | 8/1987 | Canadas | 296/97.5 |

FOREIGN PATENT DOCUMENTS

| | | | |
|---|---|---|---|
| 2530111 | 1/1977 | Fed. Rep. of Germany | 296/97.1 |
| 2633002 | 2/1978 | Fed. Rep. of Germany | . |
| 2913933 | 10/1979 | Fed. Rep. of Germany | . |
| 2429685 | 1/1980 | France | . |
| 864091 | 3/1961 | United Kingdom | . |

Primary Examiner—Johnny D. Cherry
Assistant Examiner—Joseph D. Pape
Attorney, Agent, or Firm—Gifford, Groh, Sheridan, Sprinkle and Dolgorukov

[57] ABSTRACT

A motor vehicle sun visor having a molded plastic lattice work frame capable of receiving an optional vanity mirror. The frame has an integrally molded mounting socket for receiving a swing and pivot rod which connects to a vehicle mounting bracket for installation of the sun visor in the vehicle, providing swinging between a storage and a use position and pivoting between a windshield and a side window use position.

23 Claims, 5 Drawing Sheets

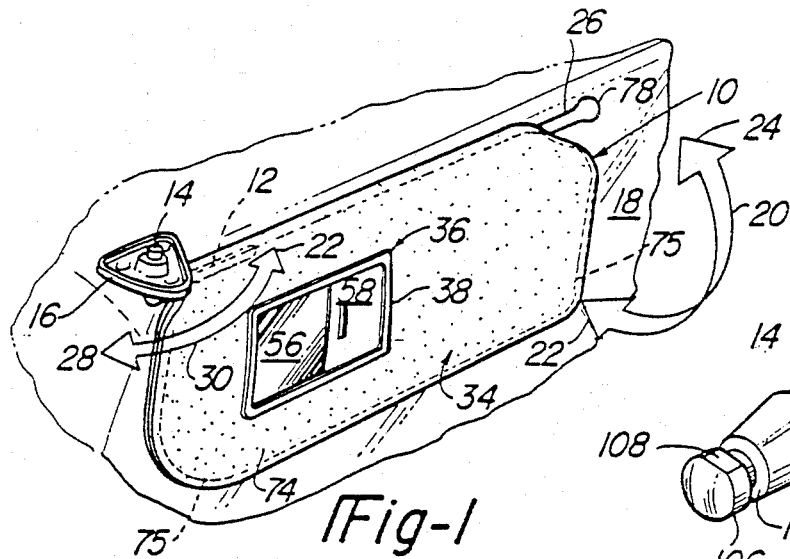
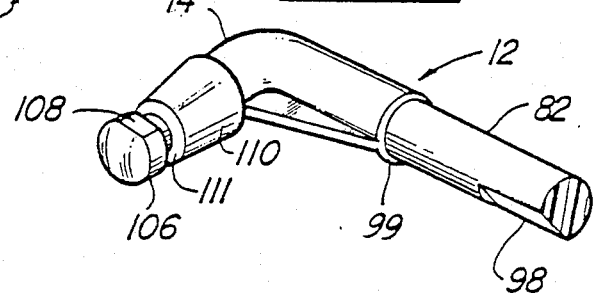
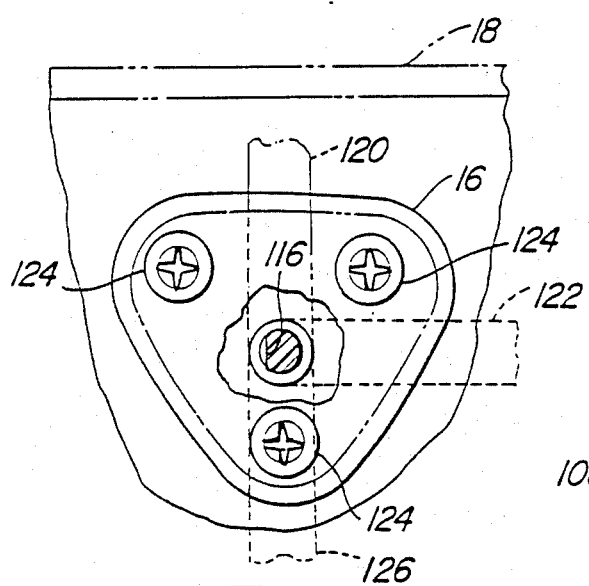
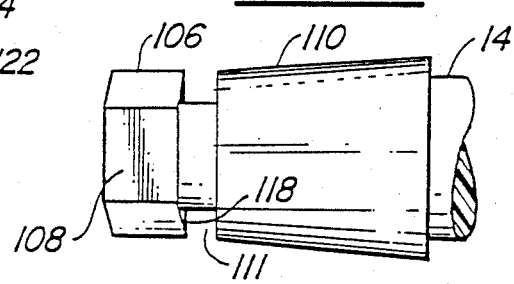
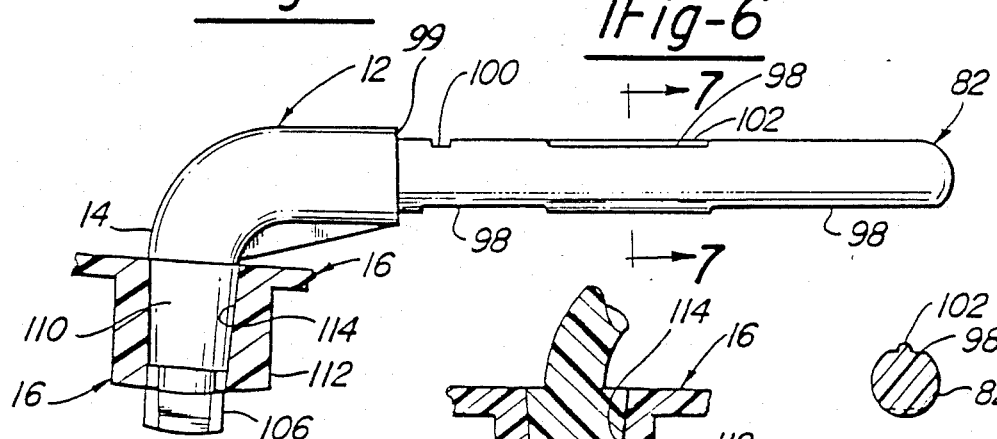
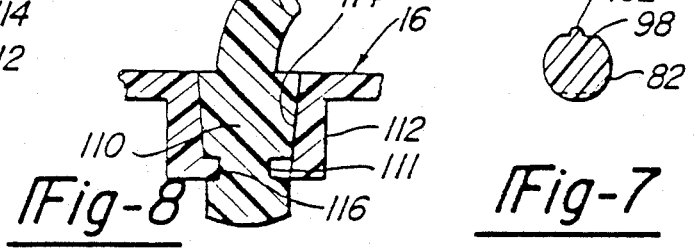

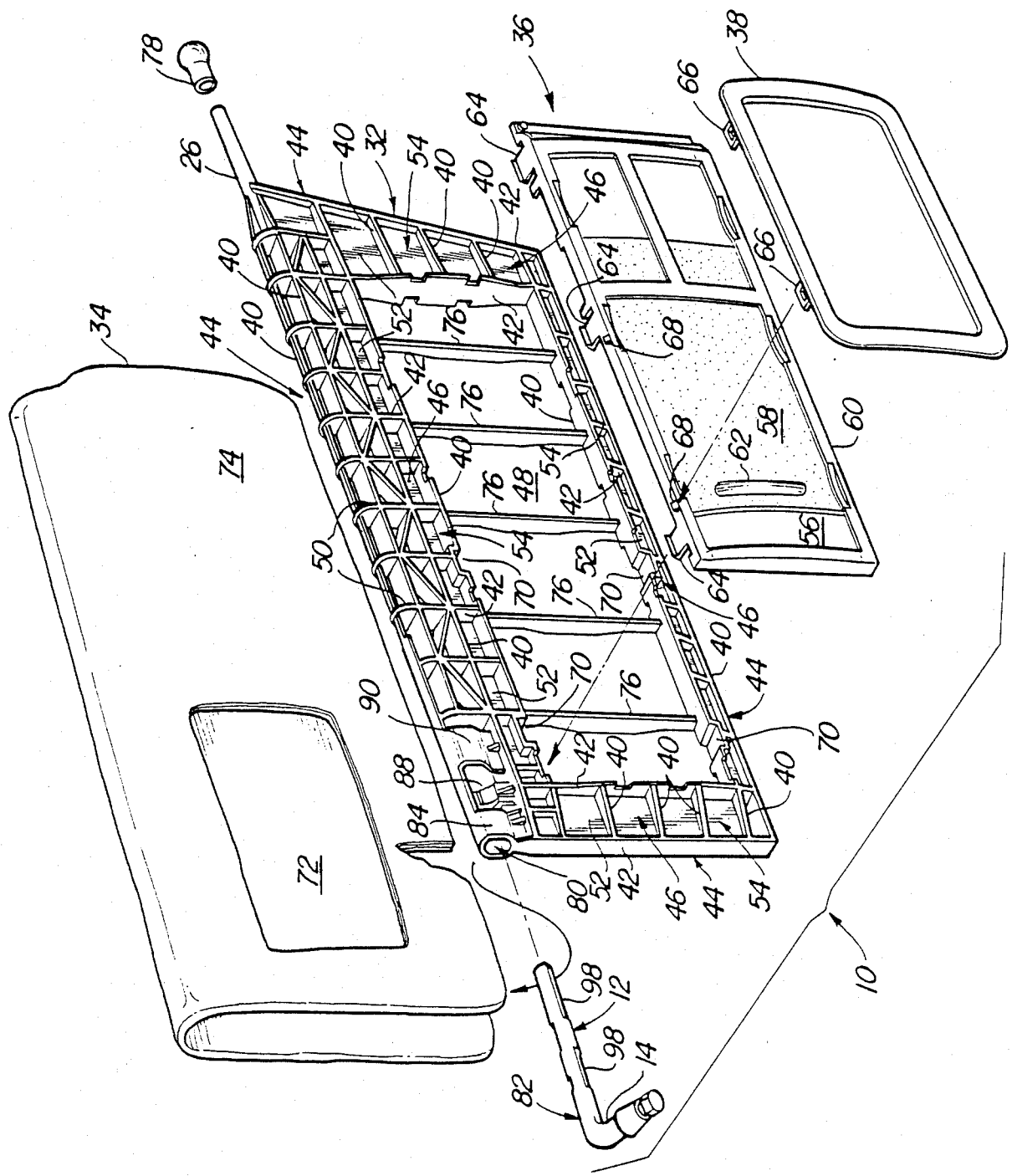

SUN VISOR FRAME AND MOUNTING STRUCTURE

This invention relates to a sun visor frame and mounting structure, and, more particularly to a molded plastic lattice work frame having an internally molded socket structure for receiving a pivot and swing rod which is connected to a vehicle by a vehicle mounting bracket. The molded frame is designed to optionally carry a sliding door mirror structure.

Conventionally sun visors have been made with a hardboard core covered with plastic foam or other suitable padding material and an outer layer of durable cloth or vinyl. Of necessity, separate metal fixtures had to be riveted or otherwise attached to the hardboard to support a rod for mounting and swinging the visor. Determination of the final contour of the sun visor with this type of structure depends primarily upon the selective placing of the padding material over the hardboard core.

Recent attempts to reduce the labor costs of constructing sun visors while attempting to increase or maintain adequate strength and integrity have led to blow molding the structure. Unfortunately, these structures have not proved satisfactory for a number of reasons. A primary problem is that of warpage or deformation which occurs most often in the summer time where temperatures inside of a closed vehicle can exceed 120° F. This results in an unsightly appearance caused by sag and also results in a structurally unsound unit.

Other attempts at molding have usually taken the form of shell molding the visor with two symmetrical or mirror image plates having a common hinge line. The plates are then folded over and cemented together. Various rib patterns have been utilized to strengthen the sheet, some of which are formed to engage each other as the parts are cemented together. Sometimes reinforcing inserts are put in between the two parts as they are being cemented together. In general, the same difficulties encountered in a blow molded structure have been experienced, namely, warpage or deformation which detracts from the appearance and reduces the structural and flexural strength.

These difficulties are normally compounded when the sun visor is subjected to the additional weight of a vanity mirror or other accessories or when the visor is designed to optionally contain a vanity mirror.

The foregoing problems inherent in prior art structures have been overcome in the sun visor constructed with the frame and mounting structure of the present invention. The frame is injection molded with longitudinally and transversly extending ribs which are interconnected to form a reinforced lattice work frame. The lattice work extends inwardly from the frame perimeter to provide a structurally rigid border or rim circumscribing a generally rectangular central area giving the requisite degree of flexural strength without detracting from the overall rigid integrity of the frame.

The frame ribs individually have a width which defines the thickness and final contour of the sun visor when a cover is applied. The covering is typically an inner fiber board cover and an outer head liner fabric.

In a preferred form of the invention, partitions are molded in the border spaces between adjacent longitudinal and transverse interconnected ribs thus forming with the ribs a continuous panel circumscribing the central rectangular area. The central rectangular area defines a vanity mirror mounting area which can accommodate a vanity mirror assembly which includes a mirror, a door configured to cover the mirror in a closed position and a sub-frame which mounts the mirror and door to the sun visor frame. In a preferred, sliding door configuration, the sub-frame accomodates movement of the door from a position over the mirror closing it to a position in the sub-frame exposing the mirror for use. Mounting tangs projecting from the mirror sub-frame mount the sub-frame to the visor frame within the mirror mounting area. A bezel mounts to the mirror sub-frame in front of the mirror acting as a border for the mirror, and the headliner fabric extends over the visor with an opening, the edges of which are retained by the bezel so that the fabric completely hides the door storage end of the mirror sub-frame.

Further structural integrity is added to the frame by molding a number of longitudinally spaced transversly extending ribs in the rectangular vanity mirror mounting area. These transverse ribs have one edge flush with the longitudinal ribs to which they are joined to provide the finished contour of the sun visor on one side, but are recessed on the other side to accomodate the mirror and mirror sub-frame structure, providing additional support therefore.

Alternatively, the mirror sub-frame can be eliminated and all of its structural elements or equivalents molded into the visor frame.

A fixed post is integrally molded with and extends from one corner of the frame parallel to the longitudinal ribs. A mounting socket is integrally molded in a second corner of the frame in line with the mounting post.

A generally L-shaped swing and pivot rod has a shorter and longer leg with the longer leg extending into the frame socket for holding the frame in a storage position on the rod and permitting the frame to be swung from the storage position to a use position on the rod. A vehicle mounting bracket receives the shorter leg of the L-shaped swing and pivot rod for mounting the visor in the vehicle for pivoting rotation between a windshield and a side window use position. A detent lock is provided to prevent removal of the swing and pivot rod from the bracket without removal of the bracket from the vehicle itself. A detent lock can also be provided to prevent removal of the swing and pivot rod from the frame socket without removal of the bracket from the vehicle itself.

The mounting socket is formed in the frame by integrally molding a plurality of gripping fingers with the frame, which fingers have generally semi-circular contact portions which engage opposite sides of the longer leg of the swing and pivot rod. There are at least two spaced fingers on one side of the pivot rod with an intermediate finger on the opposite side of the pivot rod to hold the rod positioned in intermediate use positions and in the sun visor storage position which is generally parallel to the roof of the vehicle. The semi-circular contact portions are provided with flat detent areas which coact with similarly formed flat detent areas on the longer leg of the swing and pivot rod to add additional retention force in the storage position.

The preferred embodiments of the invention of the invention are illustrated in the drawing in which:

FIG. 1 is a perspective view of a completely assembled sun visor constructed according to the present invention showing how it is mounted in a motor vehicle and indicating freedom of rotational movement for swinging the visor between a storage position and a use position and pivoting the visor between use positions;

FIG. 2 is an exploded perspective view of the sun visor of this invention, showing the component parts thereof and indicating the sequence of assembly;

FIG. 3 is a plan view of a vehicle mounting bracket viewing it installed on the roof of the vehicle and the swing and pivot rod of the instant invention shown in its installation position, in its normal windshield use position on the driver's side of the vehicle and its side window use position;

FIG. 4 is a perspective view of a portion of a swing and pivot rod of this invention showing the details of the keyed end which is inserted into the vehicle mounting bracket of FIG. 3;

FIG. 5 is a fragmentary plan view of the vehicle mounting bracket end of the swing and pivot rod shown in FIG. 4 looking at a flat on an end boss constituting the key thereof;

FIG. 6 is a full elevational view of the swing and pivot rod showing its general L-shape, flattened detent areas along the longer leg of the L which hold the visor in its storage position, and the shorter leg of the L with its flattened key surface as it is installed in the vehicle mounting bracket of FIG. 3;

FIG. 7 is a cross section of the swing and pivot rod taken along line 7—7 of FIG. 6 showing a flattened detent surface for holding the visor in its storage position and an additional rib for locking the visor in this position;

FIG. 8 is a cross sectional view of the vehicle bracket engaging end of the swing and pivot rod and a portion of the bracket showing the rod pivoted to a position in which it is locked against removal from the vehicle mounting brackets but can be pivoted between use positions;

Figure 10:
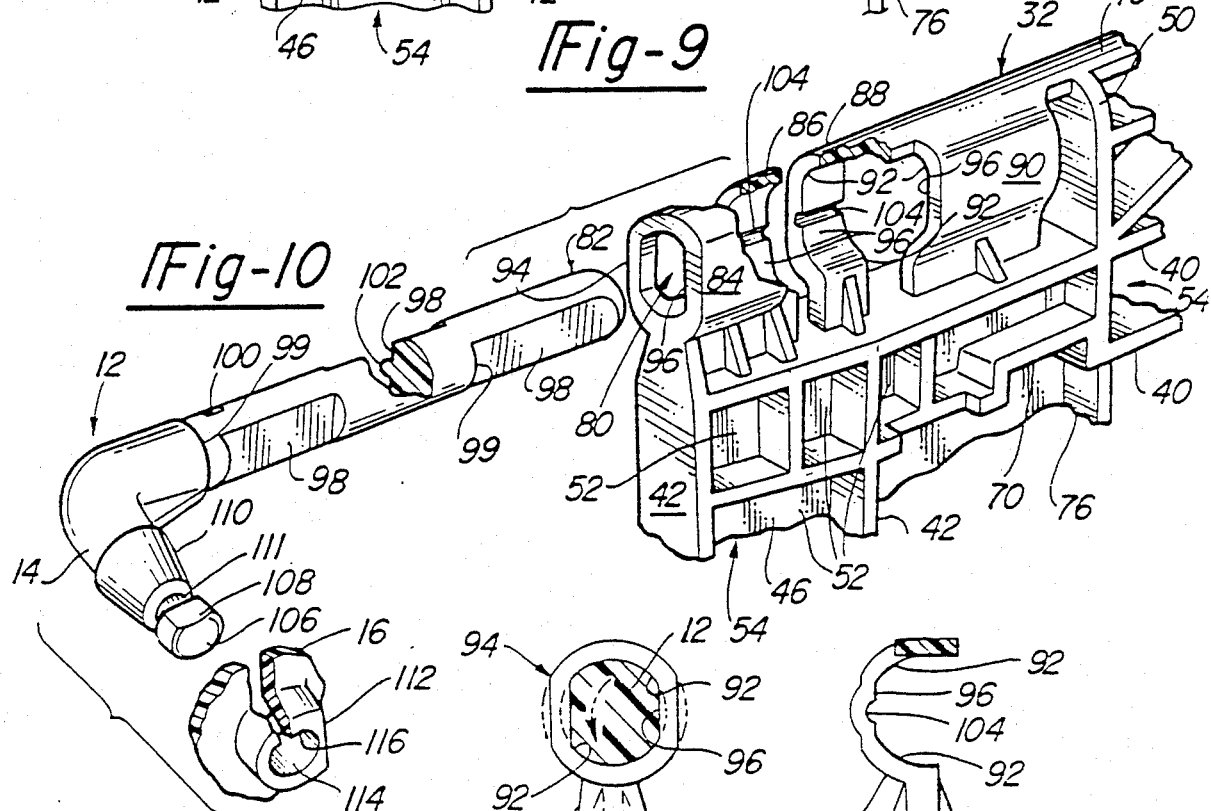
FIG. 10 is an exploded perspective view similar to FIG. 9 showing how lattice work frame will be mounted on the swing and pivot rod and the rod will be carried by the vehicle mounting bracket.
Figure 11:
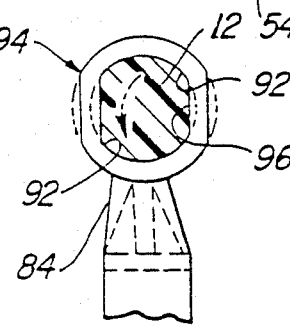
FIG. 11 is a fragmentary view taken along line 11—11 of FIG. 9 showing the end, fully closed, gripping finger of the visor frame mounting socket.
Figure 14:
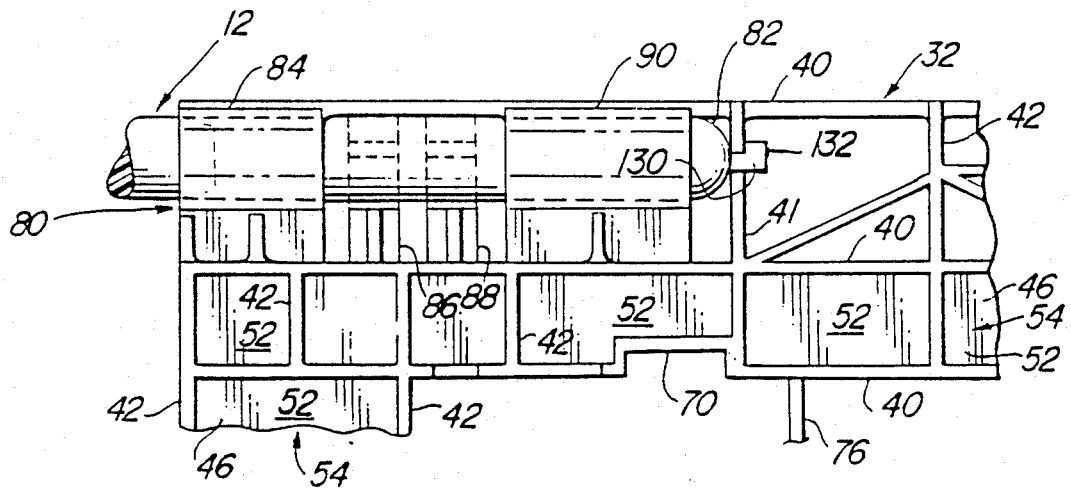
FIG. 14 is an plan view of a portion of the lattice work frame similar to FIG. 9 but showing another embodiment in which the swing and pivot rod is keyed to prevent removal from the visor frame but the frame can be rotated between storage and use positions.
Figure 15:
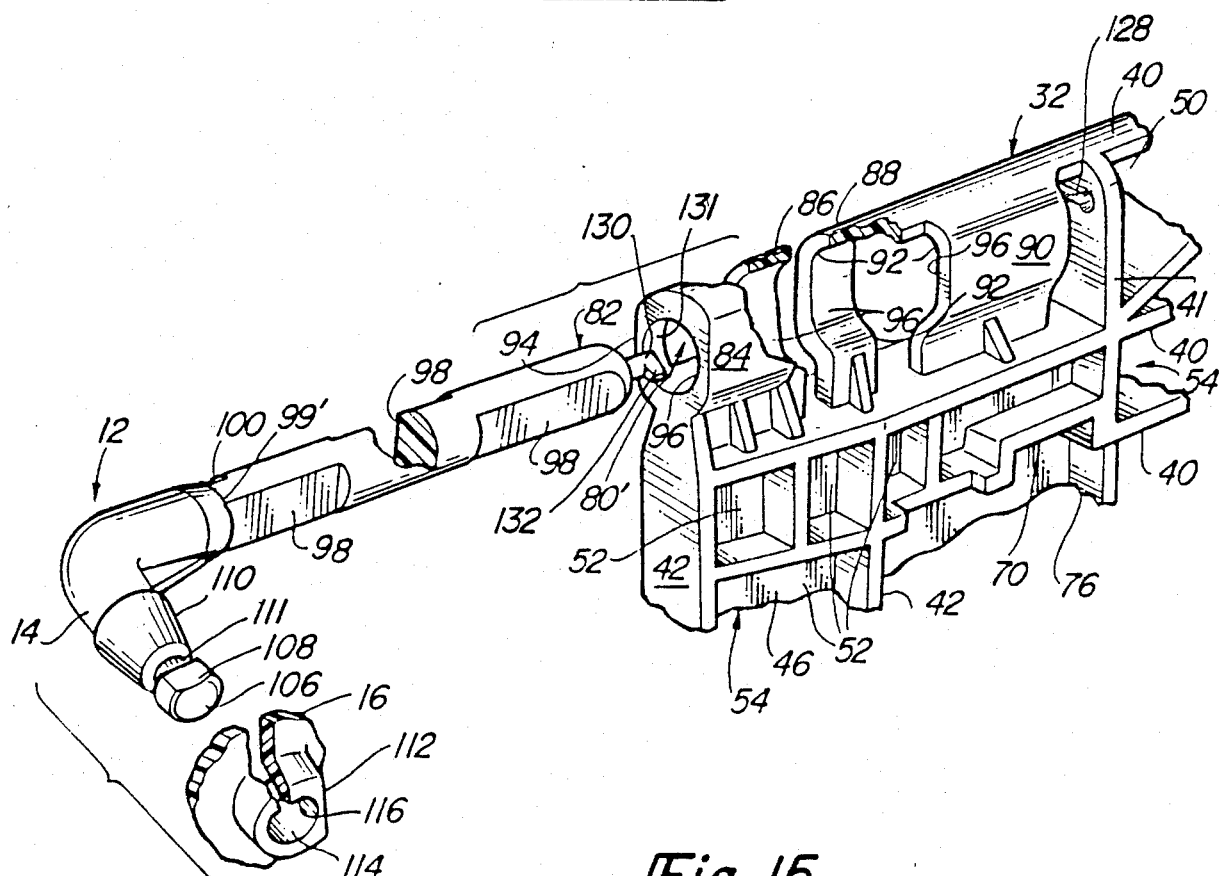
Figure 16:
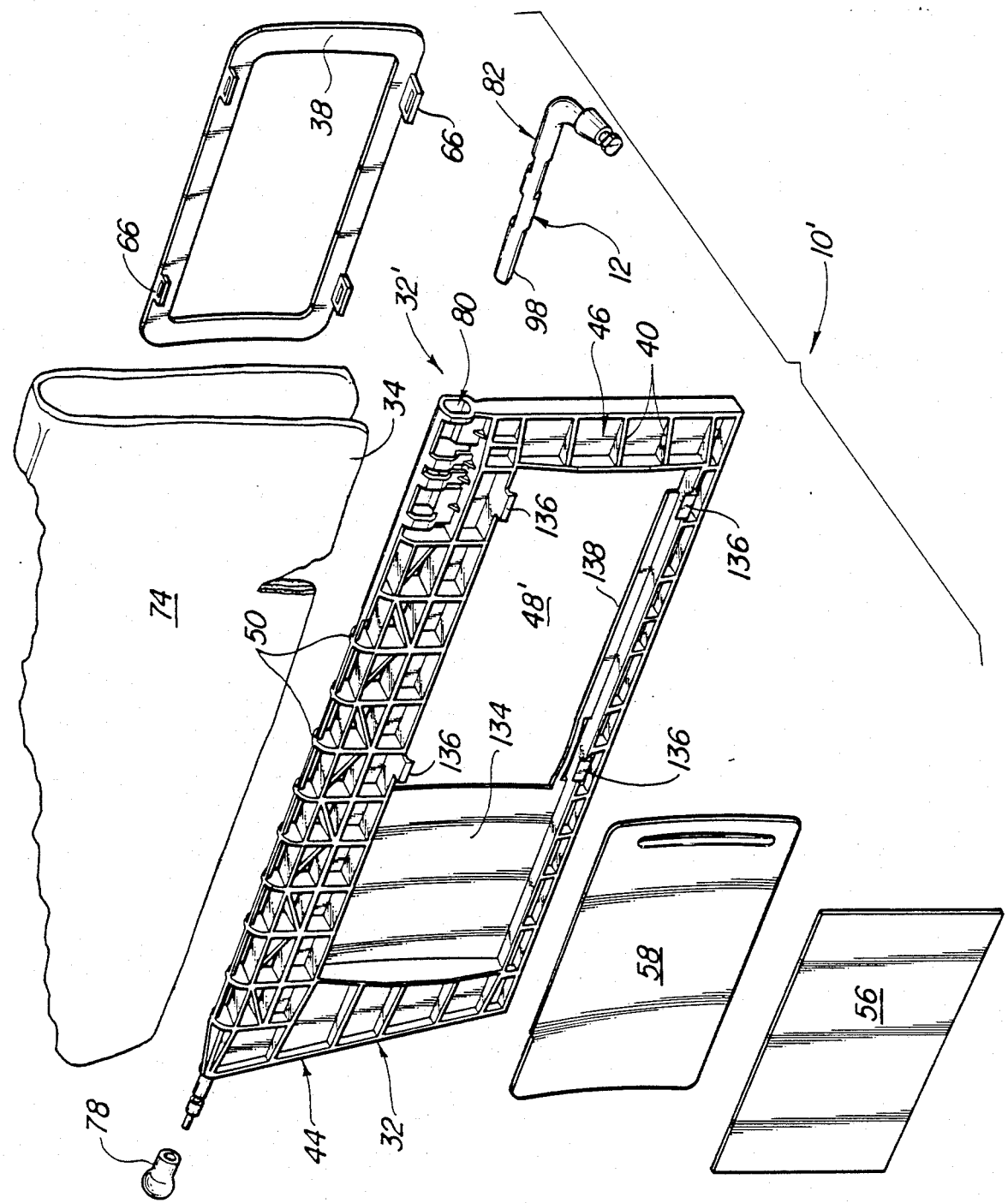

FIG. 15 is an exploded perspective view similar to FIG. 10 of the embodiment of FIG. 14 showing how the lattice work frame will be mounted on the swing and pivot rod and the rod will be carried by the vehicel mounting bracket; and FIG. 16 is an exploded perspective view similar to FIG. 2 of another embodiment of the invention which eliminates a separate mirror sub-frame, showing the component parts thereof and indicating the sequence of assembly.

Referring to FIG. 1, the sun visor 10 of this invention is shown on a swing and pivot rod 12 having one end 14 thereof extending into a vehicle mounting bracket 16 shows the sun visor 10 mounted on the driver's side and in a use position 22 shading a portion of the windshield 18. As shown by arrow 20, the sun visor 10 may be swung from its windshield use position indicated at 22 upwardly to a storage position indicated at 24 with rotation movement relative to the swing and pivot rod 12. The fixed mounting post 26 at the corner opposite to but in line with the swing and pivot rod normally aids in holding the sun visor and performing the swinging motion as it is retained in a mounting clip now shown. The swing and pivot rod 12 is retained in the vehicle mounting bracket 16 for pivoting movement about its end 14 relative to bracket 16 from its windshield use position at 22 to a side window use position at 28 as shown by pivot arrow 30.

Referring to FIG. 2, the sun visor of this invention 10 is shown as including molded plastic frame 32 with an outer cover 34. The visor is mounted for use on swing and pivot rod 12 and can include a vanity mirror assembly 36 and bezel 38.

The frame 32 is molded with a plurality of parallel longitudinally extending ribs 40 and transversely extending inner connected ribs 42 which define a lattice work frame. The lattice work extends inwardly from the frame perimeter 44 to provide a structurally rigid border or rim 46 circumscribing a general rectangular central area 48 to define a vanity mirror mounting area.

The individual longitudinal and transverse frame ribs 40 and 42 have widths which define the thickness and final contour of the sun visor when a cover is applied. For example, the top or swing and pivot rod side of the frame is formed with the transverse ribs having rounded ends 50 which blend into the peripheral longitudinal rib 40.

Figure 9:
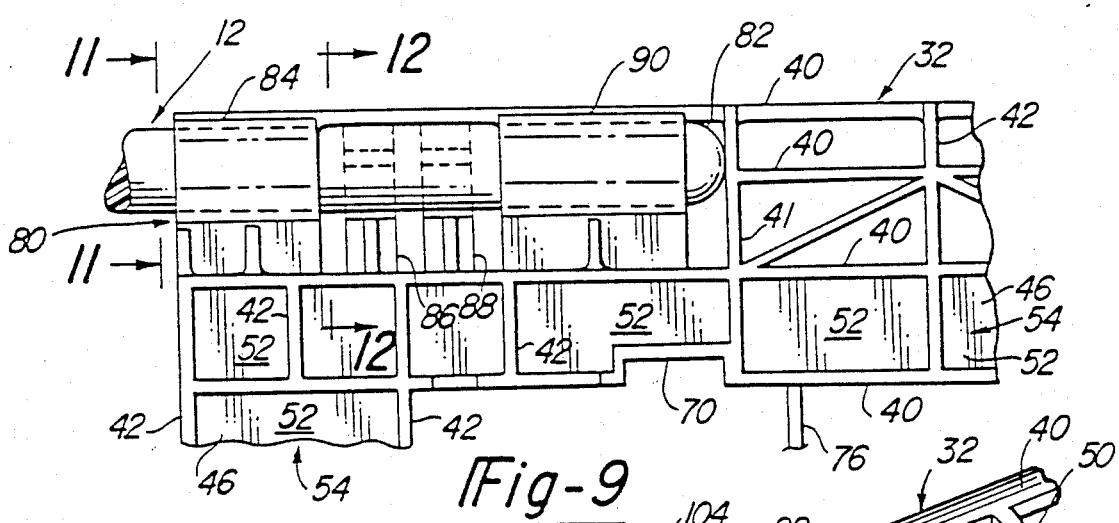
FIG. 9 is a plan view of a portion of the lattice work frame showing the mounting socket formed by oppositely facing gripping fingers molded integrally with the frame and a portion of the swing and pivot rod engaged within the socket.

In a preferred form of the invention, partitions 52 are molded in the border or rim spaces between the adjacent longitudinal and transverse inner-connected ribs 40 and 42 thus forming with the ribs a continuous panel 54 circumscribing the central rectangular area 48; see FIG. 9 and 10.

Figure 13:
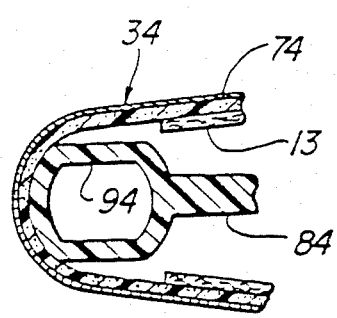
FIG. 13 is a fragmentary cross sectional view similar to FIG. 11 but showing a portion of the fiber board and laminated headliner fabric constituting the outer covering of the finished sun visor shown in FIG. 1.

A sun visor mirror assembly 36 constructed according to the teachings of our U.S. Pat. 4,653,798 can be mounted in this central area 48 according to the teachings of the patent. Vanity mirror assembly 36 includes a mirror 56, a door 58 configured to cover the mirror in a closed position and a subframe 60 which mounts the mirror 56 and the door 58 to the sun visor frame 32. The door 58 is designed to slide within the subframe 36 by pushing of handle 62. Mounting tangs 64 along the top and bottom edges of mirror subframe 60, shown only on the top edges in FIG. 2, mount the subframe to the visor frame 32. Bezel 38 mounts to the mirror subframe by the coaction of slotted tabs 66 on the top and bottom member of the bezel, seen only on the top member in FIG. 2, and outwardly extending projections 68 on the mirror subframe 60. The slotted bezel tabs 66 are accommodated in the visor frame 32 in recesses 70. Cutout area 72 in the outer cover 34 or at least in the headliner fabric 74 allow the edges of the fabric to extend under the bezel 38. The headliner fabric 74 is stitched around its periphery as shown at 75 in FIG. 1 in assembling the outer cover 34 to the visor frame 32. As shown in FIG. 13, the outer cover 34 can also include an inner fiber board 13.

Further structural integrity is added to the frame by molding a number of longitudinally spaced transversely extending ribs 76 in the rectangular vanity mirror mounting area 48. These transverse ribs 76 have one edge flush with the longitudinal ribs 40 to provide the finish contour of the sun visor on one side, and they are recessed on the other side to accommodate the vanity mirror assembly 36 lending support to the mirror 56 and the mirror sub-frame 60.

Fixed pose 26 is integrally molded with and extends from one corner of the frame 32 parallel to the longitudinal ribs 40. End cap 78 is slid over the end of post 26 and cemented thereto to provide a limit for mounting the post in a central bracket, not shown. Mounting socket 80 is integrally molded with and extends from the second corner of the frame 32 in line with post 26.

As best seen in FIGS. 2, 4, 6, and 10, the swing and pivot rod 12 is generally L-shaped having its shorter leg 14 designed to extend into the vehicle mounting bracket 16 for pivotal motion therein. Longer leg 82 extends into the frame socket 80 for holding the frame 32 in a storage position 24 on the rod and permitting the frame to be swung from the storage position 24 to a use position 22 shielding the windshield as indicated by the arrow 20.

The mounting socket 80 is formed in the frame by integrally molding therewith a plurality of gripping fingers 84, 86, 88 and 90 which have generally semi-circular contact portions 92 which engage opposite sides of the longer leg 82 of the swing and pivot rod 12. That is, extreme fingers 84 and 90 grip the leg 82 on one side and intermediate fingers 86 and 88 are in 180° opposed positions to grip the leg 82 on the other side. Finger 84 has an end portion 94 which grips the leg 82 on both sides. The resiliency of fingers 84, 86, 88 and 90 acting on opposite sides of the leg 82 will keep the frame 32 and hence the visor 10 in the position to which it is swung, for example, in the windshield use position 22 shown in FIG. 1. Further, the gripping fingers 84, 86, 88 and 90 are provided with flattented detent areas 96 which cooperate with flattened detent areas 98 on the swing and pivot rod 12 to hold the frame and hence the visor in a snapped in storage position indicated at 24 in FIG. 1. The flattened groove 100 coacts with flattened detent surface 98 at the fully closed end 94 of finger 84.

Figure 12:
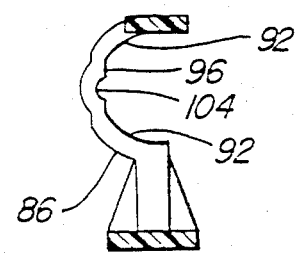
FIG. 12 is a fragmentary view taken along line 12—12 of FIG. 9 showing one of the two gripping fingers which face in the same direction having a flattened detent surface and a groove for receiving the locking rib of the swing and pivot rod.

To eliminate any tendency for the visor to vibrate or move in the storage position, an additional protuberance or rib 102 extend out from the flat detent area 98 on the swing and pivot rod leg 82 to engage a complementary groove 104 on the flattened areas 96 of intermediate gripping fingers 86 and 88 as best shown in FIGS. 7, 10 and 12.

The shorter leg 14 of the L-shaped swing and pivot rod 12 is configured with a boss 106 at its end having a flattened key or detent surface 108, a tapered journal section 110 and a cam groove 111 between the journal 110 and boss 108. The vehicle mounting bracket 16 has a body portion 112 with a socket 114 having taper complementary to the taper of journal 110. Mounting bracket body 112 has a flattened lip 116 at the end of the taper socket 114 which is complementary to the flattened key surface 108 on the rod boss 106. When the shorter leg 14 of the swing and pivot rod 12 is inserted into the vehicle mounting bracket 16, with the flattened key surface 108 on leg 14 aligned with the flattened lip 116 on the bracket body 111, the tapered journal 110 on the rod engages the tapered socket 114 and the cam surface 118 on boss 106 adjacent to cam groove 111 will act against the flattened lip 116 pulling the swing and pivot rod 12 further into the socket as the rod is rotated from an installation position 120 as shown in FIG. 3. The swing and pivot rod 12 is normally inserted into the vehicle mounting bracket 16 and pivoted from its installation position 120 to a windshield use position 122 prior to mounting the bracket on the vehicle roof with screws 124 as shown in FIG. 3. When the bracket and rod have been installed on the vehicle roof, the rod and the attached visor can be swung into a side window use position 126. The windshield 18 prevents the pivoting of the swing and pivot rod to its installation position 120 thus effectively preventing the removal of the rod 12 without removal of the bracket 16 from the vehicle.

While there is little likelihood of the visor frame 32 being removed from the swing and pivot rod 12 even during a collision impact, it is desirable to positively prevent such removal without removal of the vehicle mounting bracket 16 from the vehicle. Such a positive locking can be accomplished in a manner similar to locking of the swing and pivot rod 12 to the mounting bracket 16 by having a reduced diameter or tang portion 130 at the end of longer leg 82 of swing and pivot rod 12 which extends through aperture 128 in transverse rib 41 with a suitable locking detent 132 at the end of tang 130 as shown in FIGS. 14 and 15. A taper 99' can also be provided on leg 82 in place of shoulder 99 (compare FIG. 15 with FIGS. 4 and 6). A corresponding portion 131 of socket 80' is tapered to provide a friction engagement of the swing and pivot rod 12 with visor frame 32 as leg 82 is cammed into socket 80. Rib 102 and groove 104 used in the embodiment shown in FIGS. 6, 7, 10 and 12 can be eliminated in the embodiment of FIGS. 14 and 15.

Instead of providing a separate vanity mirror assembly 36 and associated mirror and door sub-frame 60 as shown in FIG. 2, the structural elements or their equivalents can be incorporated in visor frame 32 as shown in the sun visor 10' of FIG. 16 The generally rectangular open central area 48' is reduced in size and transverse ribs 76 are eliminated. Panel 134 located at the door storage end of the frame replaces the ribs 76. Integrally molded mounting tangs 136 replace the sub-frame tangs 64. Upper and lower longitudinal ribs 138, only the lower of which is visible in FIG. 16, are provided so that mirror 56 and door 58 can be snapped into the frames between tangs 136 and ribs 138. Bezel 38 mounts in the same manner as shown in FIG. 2.

The embodiments of the invention in which an exclusive property or privilege is claimed are defined as follows:

1. A frame and mounting structure for a motor vehicle sun visor comprising:
- a molded plastic frame having longitudinally and transversely extending interconnected ribs defining a reinforced lattice work frame;
- a fixed mounting post extending from one corner of said frame parallel to the longitudinal ribs;
- a mounting socket in a second corner of said frame in line with said mounting post, said mounting socket being formed by integrally molding with the frame at least two spaced apart fingers having generally semicircular contact portions facing in the same direction and at least one intermediate finger positioned between said two spaced apart fingers having a semicircular contact portion facing in an opposite direction, said semicircular portions having flattened first detent portions;

an L-shaped swing and pivot rod with a longer leg extending into said socket and having cooperating first detent means which engage said flattened first detent portions of said fingers to hold said frame in a storage position on said rod, and said longer leg having a round portion which engages said first detent portions of said fingers when said frame is in a use position permitting the frame to be swung from said storage position to said use position on said rod; and a vehicle mounting bracket receiving a shorter leg of said swing and pivot rod, said mounting bracket and said shorter leg of said rod having second detent means to confine said rod for pivoting rotation relative to said bracket between windshield and side window use positions but preventing removal of said rod from said bracket without removal of said bracket from the vehicle.

2. The frame and mounting structure according to claim 1 wherein said ribs define the thickness of the sun visor over which a covering is applied.

3. The frame and mounting structure according to claim 2 wherein said covering includes an inner fiber board cover and an outer headliner fabric.

4. The frame and mounting structure according to claim 3 wherein said headliner fabric is stitched around its periphery in completing a vehicle sun visor.

5. The frame and mounting structure according to claim 1 wherein partitions are formed in the spaces between adjacent longitudinal and transversely extending ribs forming with said ribs a continuous circumscribing panel providing rigidity to said frame.

6. The frame and mounting structure according to claim 5 wherein said panel defines a vanity mirror mounting area.

7. The frame and mounting structure according to claim 6 further including a plurality of longitudinally spaced transversely extending ribs in said vanity mirror mounting area adding structural rigidity to said frame and serving as support for a vanity mirror when one is mounted in said frame.

8. The frame and mounting structure according to claim 7 further including a vanity mirror assembly including: a mirror, a unitary door configurate to cover said mirror in a closed position; a generally rectangular mirror frame; a plurality of mounting tangs projecting from said mirror frame, said mirror being mounted adjacent one end of said mirror frame and said door having its longitudinal edges mounted on said mirror frame for sliding movement from said closed position at one end of said mirror frame to an open position for storage at the other end of said mirror frame, exposing said mirror for use, said vanity mirror mounting area receiving said mirror frame and said tangs in mirror frame mounting engagement.

9. The frame and mounting structure according to claim 8 further comprising a bezel mounted on said mirror frame in front of said mirror acting as a border for said mirror; and a headliner fabric extending over said visor and having an opening, the edges of which are retained between said bezel and said mirror frame, said headliner fabric completely hiding the door storage end of said mirror frame.

10. The frame and mounting structure according to claim 6 further including a partition joined to said panel at one end of said vanity mirror mounting area.

11. The frame and mounting structure according to claim 10 further including a mirror mounted at the other end of said vanity mirror mounting area; and a door mounted in said vanity mirror mounting area for sliding movement from a closed position covering said mirror to an open position for storage overlying said partition, exposing said mirror for use.

12. The frame and mounting structure according to claim 1 further comprising a rib positioned on one of said flattened first detent portions on the longer leg of said swing and pivot rod positioned to engage a groove on the flattened detent portion on said intermediate finger when said frame is positioned in a storage position on said rod.

13. The frame and mounting structure according to claim 1 wherein said second detent means is in the form of a flattened key surface on a boss at the end of said shorter leg which coacts with a flattened lip on said vehicle mounting bracket to receive said swing and pivot rod for pivoting rotation between windshield and said window use positions.

14. The frame and mounting structure according to claim 13 wherein the flattened lip on said vehicle mounting bracket is so oriented with respect to said key surface that when said bracket is mounted on the roof of a motor vehicle, the key surface on the rod boss will only align therewith when the swing and pivot rod projects the frame through the vehicle windshield, thus effectively preventing removal of the rod from the bracket without removal of the bracket from the vehicle.

15. The frame and mounting structure according to claim 1 wherein said longer leg extends into said socket with a tang at the end of said longer leg cooperating with one of said transversely extending ribs to define a third detent means confining said frame for swinging between said storage position and said use position but preventing removal of said frame from said longer leg without removal of said bracket from the vehicle.

16. The sun visor according to claim 1 wherein the innermost longitudinally and transversely extending ribs define a central, generally rectangular vanity mirror mounting area, and wherein a mirror is mounted in said area.

17. The sun visor according to claim 16 further including a door for covering said mirror.

18. The sun visor according to claim 17 wherein said door is mounted in said vanity mirror mounting area for sliding movement from a closed position covering said mirror to an open position for storage, exposing said mirror for use.

19. The sun visor according to claim 17 further including a sub-frame mounting said mirror and door in said vanity mirror mounting area.

20. The sun visor according to claim 1 wherein said longer leg and said mounting socket have cooperating means to confine said frame for swinging between said storage and said use positions but preventing removal of said frame from said longer leg without removal of said bracket from said vehicle.

21. A sun visor for a motor vehicle including a frame and mounting structure comprising:

a molded plastic frame having longitudinally and tranversely extending interconnected ribs defining a reinforced latice work frame which borders a rectangular open vanity mirror mounting area having integrally molded means for retaining a mirror in a fixed position at one end of said area and for retaining a door for sliding movement in said area;

a mirror retained in said fixed position in said mounting area;

a door retained on said mounting area for sliding movement from a closed position covering said mirror to an open position for storage at the other end of said area, exposing said mirror for use;

an L-shaped swing and pivot rod having a shorter and longer leg;

a mounting socket integrally molded in a corner of said frame opening parallel to said longitudinally extending ribs and having a plurality of gripping fingers with generally semi-circular contact portions which engage said longer leg from opposite sides thereof to hold said frame positioned on the longer leg of said rod and permitting the frame to be swung from a storage position to a use position; and a vehicle mounting bracket receiving the shorter leg of said L-shaped rod, said mounting bracket and said rod having means when the bracket is mounted on a vehicle roof to confine said rod for pivoting rotation relative to said bracket between windshield and side window use positions.

22. The sun visor according to claim 21 wherein said generally semi-circular contact portions of said gripping fingers have flattened portions which engage corresponding flattened portions on the longer leg of said rod when said frame is in said storage position on said rod, and engage a round portion of said rod in a use position of said frame.

23. The sun visor according to claim 22 wherein said longer leg and said mounting socket have cooperating means preventing removal of said frame from said longer leg without removal of said bracket from said vehicle.

* * * * *